(No Model.) 2 Sheets—Sheet 1.

P. W. GATES.
STONE BREAKER AND CRUSHER.

No. 305,172. Patented Sept. 16, 1884.

Witnesses:
B. Carlyle Fenwick.
Robt. L. Fenwick.

Inventor:
Philetus W. Gates
by his Attys.
Fenwick & Lawrence (No Model.)  2 Sheets—Sheet 2.

P. W. GATES.
STONE BREAKER AND CRUSHER.

No. 305,172. Patented Sept. 16, 1884.

Witnesses:
B. Carlyle Fenwick
Robt. L. Fenwick

Inventor:
Philetus W. Gates
by his Attys
Fenwick & Lawrence

100
UNITED STATES PATENT OFFICE.

PHILETUS W. GATES, OF CHICAGO, ILLINOIS.

STONE BREAKER AND CRUSHER.

SPECIFICATION forming part of Letters Patent No. 305,172, dated September 16, 1884.

Application filed January 2, 1883. Renewed January 31, 1884. (No model.) Patented in England May 7, 1881, No. 1,995; in France May 7, 1881. No. 142,733; in Belgium May 9, 1881, No. 54,578, and in Canada July 26, 1881, No. 13,178.

*To all whom it may concern:*

Be it known that I, PHILETUS W. GATES, a citizen of the United States, residing at Chicago, in the county of Cook and State of Illinois, have invented a new and useful Improvement in Stone Breakers and Crushers, of which the following is a specification.

My invention relates to an improvement in the stone-breaker for which I filed an application for a patent on the 17th of February, 1879, which was granted February 13, 1883, No. 272,233, my present invention being a division of the subject-matter thereof, and which was patented to me in England May 7, 1881, No. 1,995; in France May 7, 1881, No. 142,733; in Belgium May 9, 1881, No. 54,578, and in Canada July 26, 1881, No. 13,178.

My invention consists in a novel combination of the leverage break-pin and fastening-screw with the power-shaft, a bevel-wheel on said shaft, provided with lugs for breaking the pin, and with the bevel-wheel of the gyrating crusher-shaft of the stone-breaker. This combination is such that the break-pin is unsupported between the shaft or collar and the breaking-lugs, and is broken by a leverage power derived from the temporary interruption or stoppage of the gearing caused by a foreign irreducible substance coming in contact with the crushing-surface. By my present invention the toothed gear-wheel will instantly become loose upon the power-shaft by the breaking of the safety-pin, which occurs when an extraordinary strain comes upon the machinery, and thus the machinery will be stopped from operating and saved from damage, while the power-shaft may continue to revolve.

Figure 1:
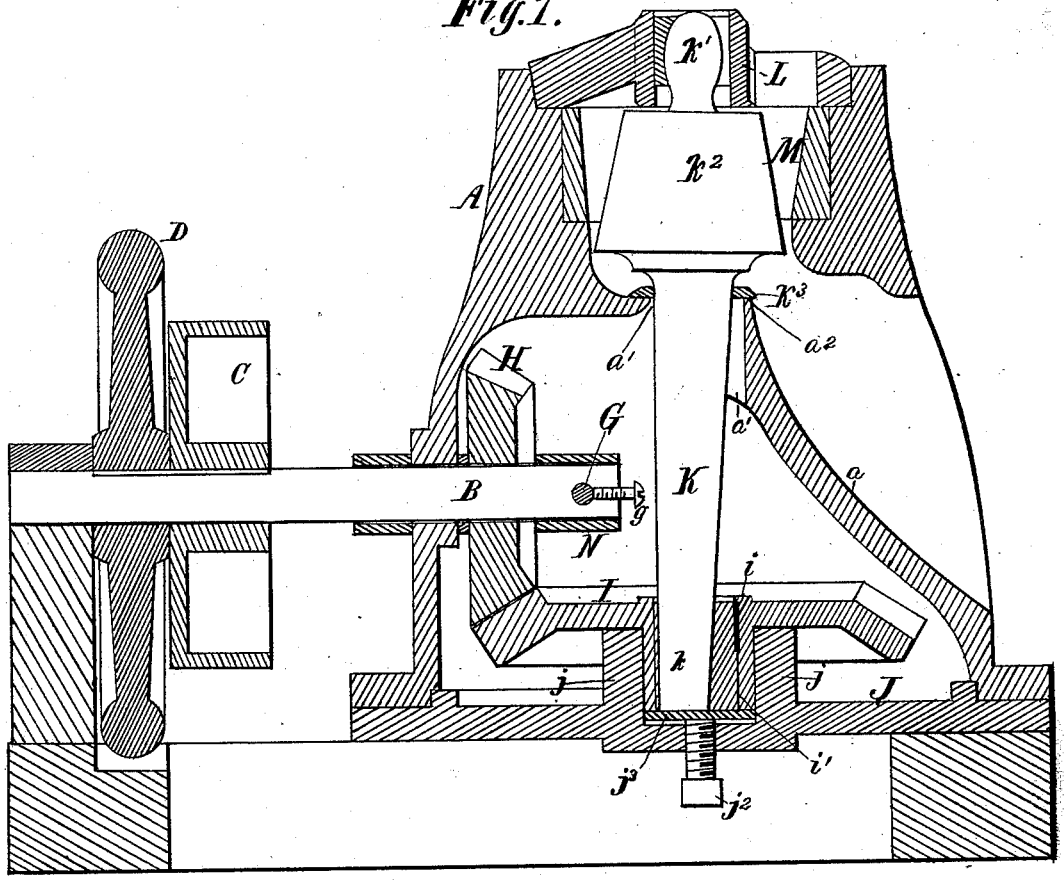
Figure 2:
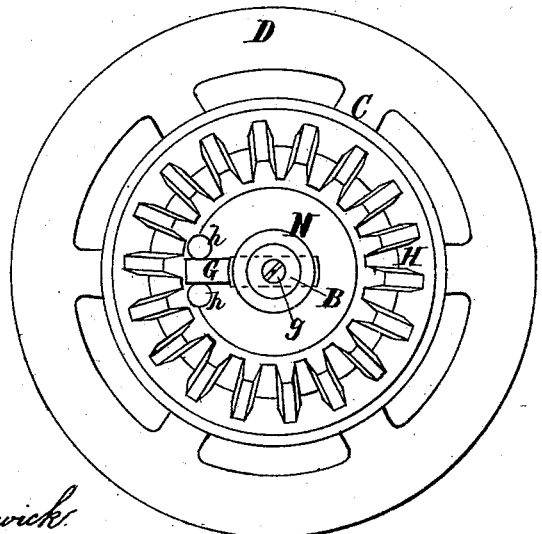
Figure 3:
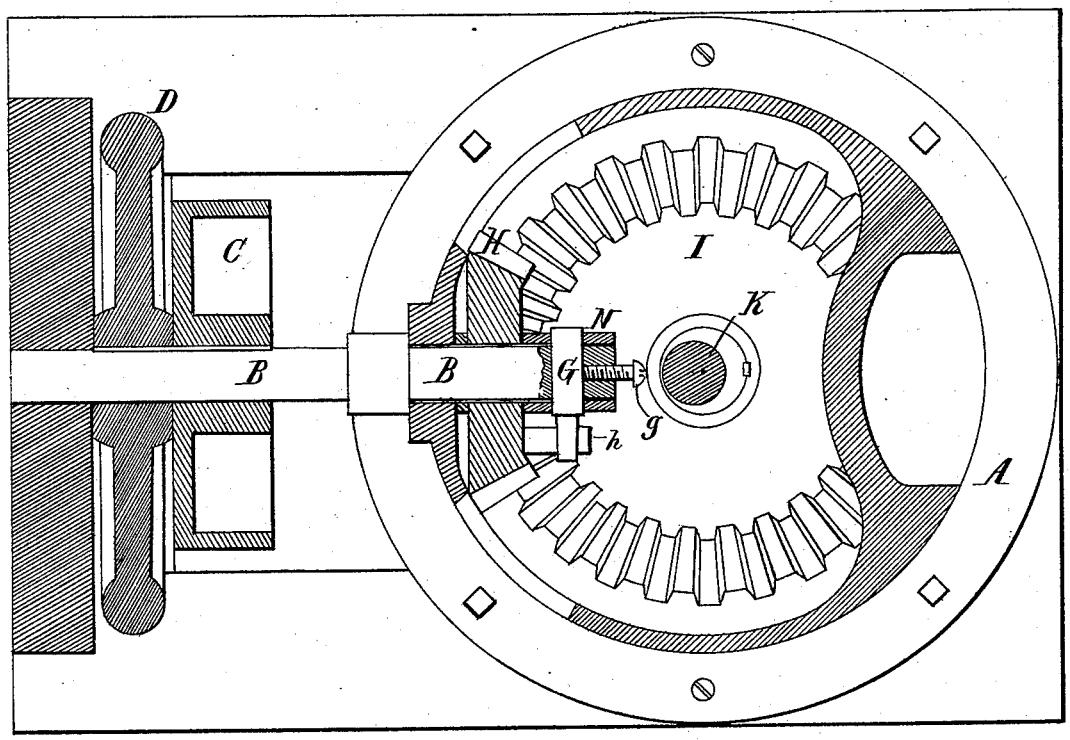

In the accompanying drawings, Figure 1 is a vertical longitudinal section of a stone-breaker similar to that shown in my application filed February 17, 1879, with my improvement applied to it. Fig. 2 is a detail end view of the power-shaft with bevel-wheel, safety devices, and other parts applied to it; and Fig. 3 is a horizontal section of Fig. 1.

In the figures of the drawings, A represents the circular shell-frame of the crusher or stone-breaker. This frame rests upon and is united to a base-plate, J, upon which is formed an oil step-box, $j$, open at top, closed at bottom, and provided with a step-block, $j^3$, and an adjusting-screw, $j^2$, as shown. The frame is provided with suitable openings in its circumference for the escape of crushed material and the insertion of the gearing; and it also is provided with a diaphragm shielding-chute, $a$, having an aperture, $a'$, surrounded by a bearing, $a^2$, a flaring concave with suitable lining, M, and an open cap portion with bearing-box L, into which latter a sliding bearing for a ball, $k'$, of the crusher-shaft is fitted. Within the oil step-box an eccentric revolving bearing, $i'$, fitted and keyed within a hub, $i$, of a bevel-wheel, I, is suspended, as shown. A revolving crusher-shaft, K, with crusher-head $k^2$ attached to it, and having a journal end, $k$, at its lower and ball $k'$ at its upper end, is applied within the shell-frame A, as shown. The ball $k'$ has its support in the sliding bearing of the box. The crusher-head occupies a place within the concave, and its shaft passes down through the opening $a'$ of the diaphragm-chute, and its journal end $k$ is fitted loosely in the revolving eccentric bearing $i'$ of the step-box $j$, being supported upon the step-block $j^3$ and adjusting-screw $j^2$, as shown.

Around the shaft K and upon the bearing $a^2$ a loose dust-excluding collar, $k^3$, is make to rest and fit, dust-tight, as shown.

The main driving-shaft B carries a driving-pulley, C, a fly-wheel, D, and a bevel gear-wheel, H, which latter gears with the bevel-wheel I of the eccentric bearing $i'$, and gives rotary motion to said bearing and a gyrating motion to the shaft and crusher-head. This motion of the shaft causes the crusher-head to crush or break the stone within the concave with an impacting force, while the resistance of the stone, during the breaking operation, causes the shaft and its crushing-head to gradually turn backward about its own axis, the loose journal end of the shaft and the ball at the upper end permitting this action to take place.

The machine thus far described is similar to the one described in my aforesaid patent, and therefore is not claimed herein, except so far as its parts are employed in connection with the improvement which I shall now proceed to describe. In order to save the described stone breaker or crusher, or machines of analogous construction for crushing stone, from destruction, when a crow-bar or other such irreducible obstacle is presented to the crusher-head, I have devised a novel combination of means whereby the toothed gear-wheel of the driving-shaft, instead of the driving-pulley and fly-wheel, as in my aforesaid patent, can be made to become loose on the shaft.

By referring to the drawings it will be seen that the toothed wheel H is loosely fitted upon the shaft B, and is prevented from slipping longitudinally by means of a loose collar, N, fixed upon the shaft B, by passing a safety or leverage break-pin, G, through it and the shaft. A set-screw, $g$, is passed into the end of the shaft and against the side of the pin, as shown, for the purpose of fastening the pin in place. The break-pin is made of a strength equal to the full working resistance of the machinery, and is intended to break when the strain exceeds that capacity.

On the face of the wheel H two lugs, $h$, are provided, and between these lugs the protruding extension or end of the pin G is held, as shown. The pulley C and the fly-wheel D are keyed fast to the shaft, so that, in case the pin G breaks, the pulley C, fly-wheel D, and shaft B will continue to revolve, while the toothed wheel H and other parts of the machine remain at rest. This mode of applying the safety-pin gives a long leverage in the pin itself, between its supported ends, and by this means the pin will break readily midway of its length, between its supported ends, when said ends are pressed against by a force greater than it is intended the pin shall be capable of resisting; and hence the pin can be more readily broken in two transversely than can a pin which has its whole length or body supported.

This pin thus applied can be readily withdrawn and a new one substituted without removing the gearing.

It is found in practice that the safety break-pin may be made of either metal or wood.

What I claim as my invention, and desire to secure by Letters Patent, is—

The combination of the break-pin G and set-screw $g$ with the shaft B, bevel-wheel H, provided with lugs $h$, bevel-wheel I, and crusher-shaft K, substantially as and for the purpose described.

PHILETUS W. GATES.

Witnesses:
J. L. FARGO,
RYERSON D. GATES.